(12) United States Patent
Nesheim (10) Patent No.: US 7,003,935 B2
(45) Date of Patent: Feb. 28, 2006

(54) MOWER WITH INTEGRATED OCCUPANT PRESENCE AND INDEPENDENT DRIVE AND BRAKE LOCKOUT

(75) Inventor: Jeffrey C. Nesheim, Janesville, WI (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 10/285,710

(22) Filed: Oct. 31, 2002

(65) Prior Publication Data

US 2004/0083699 A1    May 6, 2004

(51) Int. Cl.
*A01D 69/00*    (2006.01)
(52) U.S. Cl. .................................. 56/10.8
(58) Field of Classification Search ........... 56/12.7, 56/10.8, 11.3, 11.6–11.8, DIG. 6
See application file for complete search history.

(56) References Cited

U.S. PATENT DOCUMENTS

| | | | |
|---|---|---|---|
| 2,718,154 A * | 9/1955 | Mathson | 474/5 |
| 3,616,869 A | 11/1971 | Rilling | |
| 4,558,558 A | 12/1985 | Horner, Jr. et al. | |
| 4,743,220 A * | 5/1988 | Berrios | 474/7 |
| 4,934,989 A * | 6/1990 | Furukawa et al. | 474/135 |
| 5,042,239 A | 8/1991 | Card | |
| 5,146,735 A | 9/1992 | McDonner | |
| 5,155,985 A * | 10/1992 | Oshima et al. | 56/10.8 |
| 5,343,678 A | 9/1994 | Stuart | |
| 5,517,809 A | 5/1996 | Rich | |
| 5,526,635 A * | 6/1996 | Wilder, Jr. | 56/11.3 |
| 6,543,560 B1 * | 4/2003 | Trefz et al. | 180/53.4 |

* cited by examiner

*Primary Examiner*—Thomas B. Will
*Assistant Examiner*—Alicia Torres
(74) *Attorney, Agent, or Firm*—Harness, Dickey & Pierce, P.L.C.

(57) ABSTRACT

Disclosed is a lawn mower device having a drive configured to rotate a shaft in a first and second direction. A drive wheel is coupled to the shaft and is coupled to a driven wheel by a drive belt. A tensioning system is shown coupled to the drive belt. The tensioning system has a first idler plate configured to bias a first idler pulley against the drive belt when the drive is rotating the shaft in the first direction and a second idler plate configured to bias a second idler plate against the drive belt when the drive is rotating the shaft in a second direction. A brake mechanism is further coupled to the tensioning system. The brake mechanism is configured to resist the rotation of the driven wheel.

31 Claims, 8 Drawing Sheets

FIGURE 14

MOWER WITH INTEGRATED OCCUPANT PRESENCE AND INDEPENDENT DRIVE AND BRAKE LOCKOUT

FIELD OF THE INVENTION

The present invention relates to a drive mechanism for a walk behind lawn mower and, more particularly, to a zero turn radius drive mechanism having incorporated forward/reverse and braking features incorporated into a belt driven drive system.

BACKGROUND OF THE INVENTION

Conventional commercial walk-behind turf care machines, such as walk-behind lawnmowers include a number of levers and linkages used to control machine operation. During routine operation, these machines must often be maneuvered around trees, flower beds and other obstacles quickly and with precision. Because these machines typically weigh several hundred pounds, it would be labor intensive, if not impossible, to operate and maneuver the turf care machines in such a manner for extensive periods of time without some type of operator assist device.

Therefore, commercial turf care machines are typically equipped with self-propelling drive mechanisms for driving the wheels of the machines. These drive mechanisms typically include a mechanism for transferring the driving torque from a source of power such as an internal combustion engine to at least two of the machine wheels, thereby turning the machine wheels and assisting the machine operator in both propelling and maneuvering the piece of equipment.

While both hydraulic and mechanical drive mechanisms have been commonly used in the past, belt driven drive mechanisms are being implemented in walk-behind turf care machines on an ever increasing basis due to the decrease in price and known reliability of such systems. Belt driven drive mechanisms have long been known to exhibit desirable characteristics such as allowing a machine operator to quickly switch among forward, neutral and reverse modes of operation.

A turf care machine operator manipulates a typical belt driven drive mechanism through a plurality of levers located on an operator/turf machine interface such as a pair of handle bars. These operator control systems typically include both belt tensioning and speed controls and enhance machine operability and maneuverability. Additionally, separate braking controls are provided which can readily be used to stop a moving self propelled mower. A typical belt tensioning control provides the machine operator with selective control among forward, neutral and reverse modes of operation, while a typical speed control provides the operator with a control for regulating the maximum forward speed at which the machine can be operated.

While present belt driven drive operator control systems such as those described above exhibit sufficient performance characteristics, such systems require numerous linkages between the components to implement, thus increasing turf care machine cost. It is also desirable to provide more ergonomic arrangements for the operator controls to facilitate ease of operation and provision of operation instructions.

SUMMARY OF THE INVENTION

It is an object of the present invention to overcome the deficiencies as described in the prior art. In this regard, shown is a lawn mower device having a drive configured to rotate a shaft in a first and second direction. A drive wheel is coupled to the shaft and is coupled to a driven wheel by a drive belt. A tensioning system is shown coupled to the drive belt. The tensioning system has a first idler plate configured to bias a first idler pulley against the drive belt when the drive is rotating the shaft in the first direction and a second idler plate configured to bias a second idler plate against the drive belt when the drive is rotating the shaft in a second direction. A brake mechanism is further coupled to the tensioning system. The brake mechanism is configured to resist the rotation of the driven wheel.

Another embodiment of the present invention, the first and second idler plates are coupled together by a linkage. Rotation of the first idler plate to bias the first idler pulley against the belt rotates the second idler plate and, therefore, the second idler pulley away from the drive belt.

In another embodiment of the present invention, a lawn mower having a drive mechanism configured to drive a shaft in a first and second direction is disclosed. A drum pulley is coupled to the shaft. A drive wheel is coupled to the drum pulley by a flexible member or flexible drive belt. A tensioning system is configured to apply tension to a first slack side of the flexible drive belt when the drive shaft is driven in a first direction and apply tension to a second slack side of the flexible drive belt when the drive shaft is driven in a second direction. A braking system is further provided which is operable to inhibit the rotation of the driven wheel. The braking system is actuated through the tensioning system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
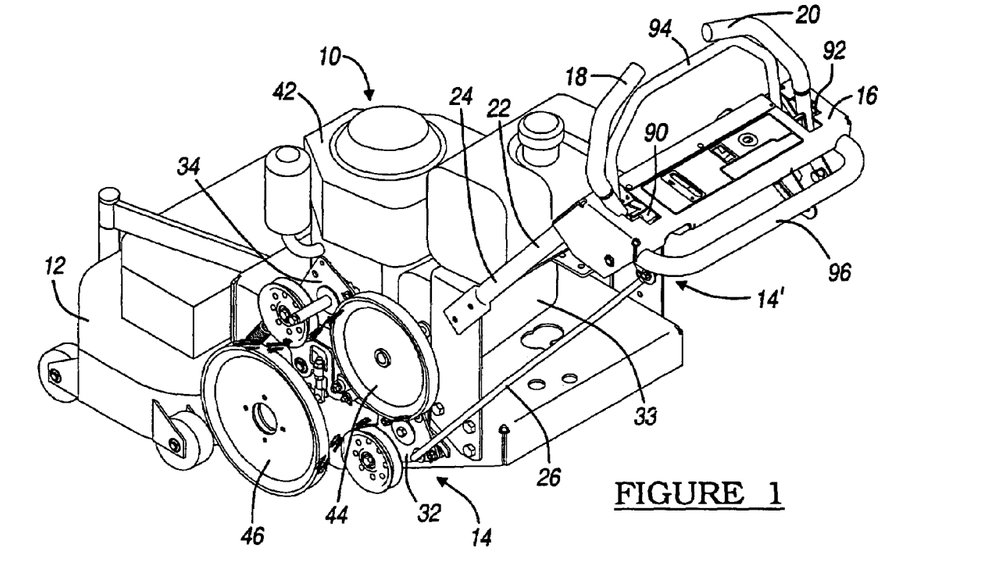
FIG. 1 represents a rear perspective view of the mower according to the present invention.

FIG. 1 represents a perspective view according to the teachings of the present invention. Shown is a mower 10 having a support structure 12, drive mechanism 14, control panel 16, and a pair of handles 18 and 20. Disposed between the support structure 12 and the control panel 16 is a support structure 22 having a pair of support bars 24 and a control mechanism 26.

The handles 18 and 20 of control panel 16 functions to regulate the drive mechanisms 14 and 14' and the left and rear wheels 28 and 30. The control mechanism 26 controls the drive mechanism 14 by regulating the movement of an idler mechanism 31, which has first and second idler arms or plates 32 and 34. As further described below, the idler arms 32 and 34 regulate the movement of the idler pulleys 36 and 38 and braking mechanism 40.

The drive mechanism 14 is driven by an engine 42 through a gear box 33. The gear box 33 drives a pair of pulleys 44 and 46 in both forward and reverse directions. In this regard, the drive wheel or pulley 44 and pulley 46 are coupled by a flexible drive belt 47. The tension of the flexible drive belt 47 is regulated by the tensioning mechanism 31.

Figure 2:
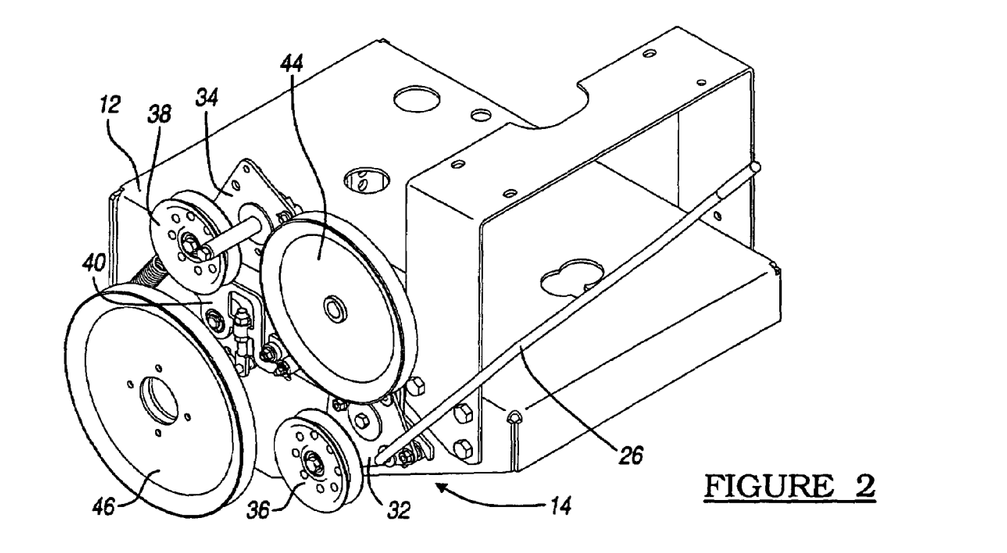
FIG. 2 represents a perspective view of the drive mechanism according to the teachings of the present invention.
Figure 3:
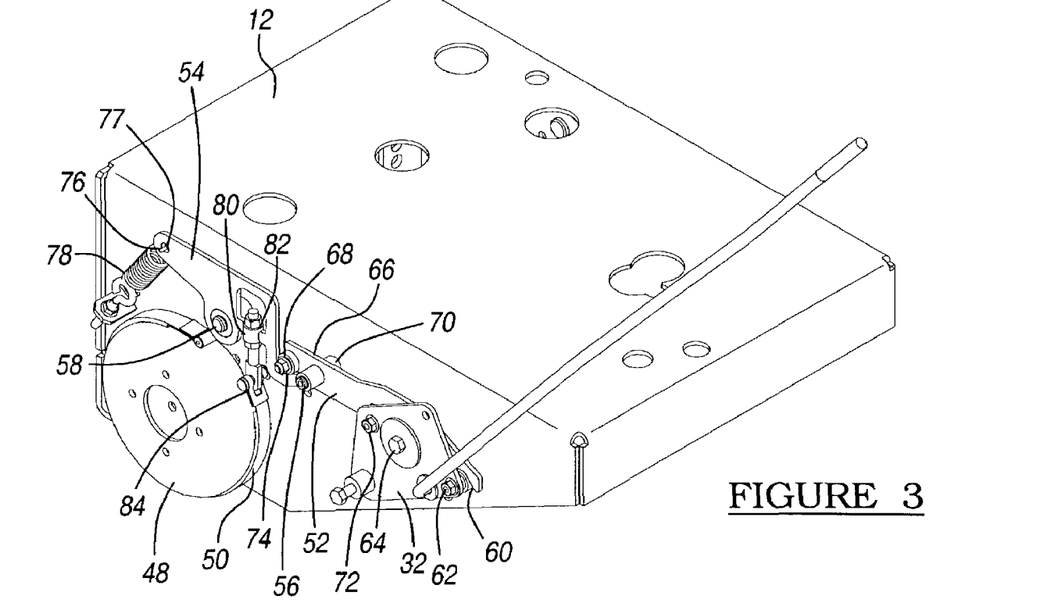
FIG. 3 represents a rear perspective view of the brake mechanism shown in FIG. 2.

As best seen in FIGS. 2 and 3, the braking mechanism 40 is coupled to the support structure 12. The braking mechanism 40 is formed of a brake drum 48, which is coupled to the driven wheel and friction belt 50, and first and second members 52 and 54. The first and second members 52 and 54 are rotatably coupled to the mower deck at pins 56 and 58. The first member 52 has a first engaging surface 60 which received application of forces from a bearing 62 which is coupled to the first idler plate 32. In this regard, the rotation of the idler plate 32 in a counterclockwise orientation rotates the bearing 62 with respect to the rotation axis 64 of the idler plate 32. This rotation applies forces to the engaging surface 62 of the first member 52, thus rotating the first member about the pin 56. The second end 66 of the first member 52 has an engaging pin 68 which mates with the first engaging surface 74 of the second member 54. Additionally, idler plate 32 has a second pin 72 which applies forces to the first member 52 when the idler plate 32 is rotated in a clockwise fashion. This rotation disengages the brake mechanism when the mower is in reverse.

On the second end 76 of the second member 54 is an aperture 77 which is coupled to a biasing spring 78. The biasing spring 78 is fixedly coupled to the support structure 12. Coupled to the medial portion 80 of the second member 54 is an adjustable linkage 82 which couples a first end 84 of the friction belt 50 to the second member 54. The second end of friction belt 50 is fixed to support frame 12.

Figure 4:
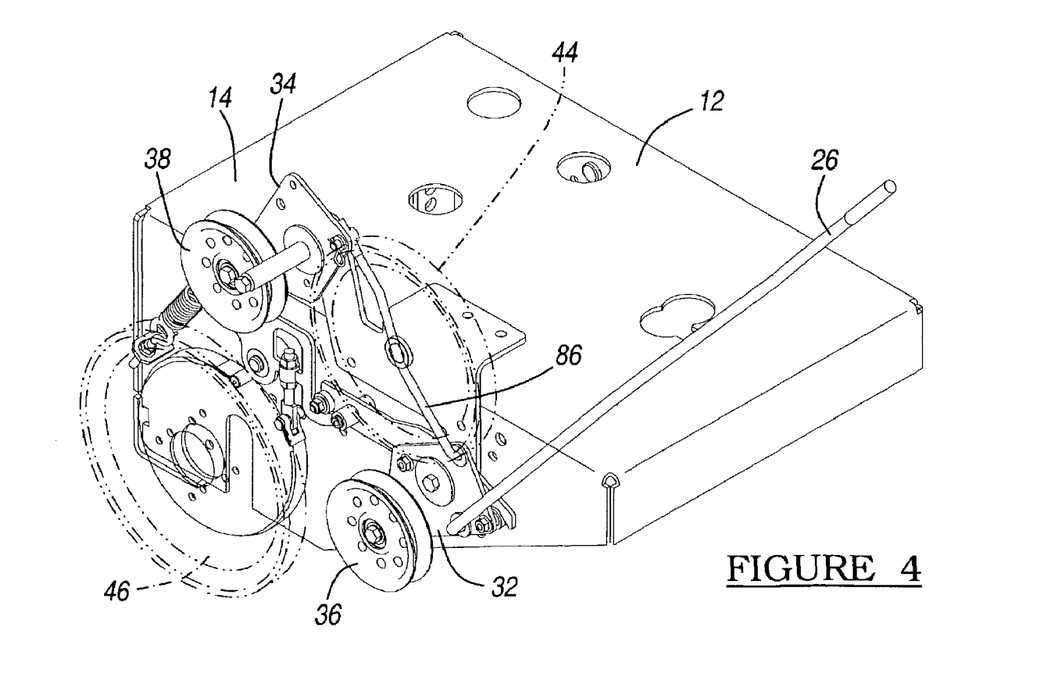
FIG. 4 is a rear perspective view of the drive mechanism according to the teachings of the present invention.

FIG. 4 depicts the drive mechanism 14 with drive wheel 44 and driven pulley 46 being shown in phantom. The driven pulley 46 is coupled to wheel 28. The drive mechanism 14 functions to drive the driven pulley 46 in a forward and rearward direction. The direction of the driven wheel is changed by the gear box (not shown). In this regard, the flexible drive belt 47 is disposed about the drive and driven pulley 44 and 46.

The tensioning system 31 is coupled to the flexible drive belt 47 and has a first idler arm or idler plate 32 which is configured to bias a first idler pulley 36 against the flexible drive belt 47 when the drive is rotating in a reverse direction. The tensioning system 31 further has a second idler plate or arm 34 configured to bias a second idler pulley 38 against the flexible drive belt 47 when the drive is rotating the shaft in a forward direction. In this regard, the tensioning system 31 is configured to apply tension to the first slack side of the flexible drive belt 47 when the drive shaft is driven in a first direction and apply tension to the second slack side of the flexible drive belt 47 when the shaft is driven in a second direction.

As can be best seen in FIG. 4, the idler plates 32 and 34 are coupled together by a linkage 86. This linkage 86 configures the tensioning system 31 so that when the first idler plate 32 biases the first idler pulley 36 into the flexible drive belt 47, it rotates the second idler plate 34 so as to pull the second idler pulley 38 away from the flexible drive belt 47. A separate control lever is coupled to and controls the movement of gears within the gear box 31 to change the direction and speed of the rotation of the drive pulley 46.

The brake mechanism 40 is coupled to the tensioning system 31, and is configured to resist the rotation of the driven pulley 46. In this regard, the first member 52 of the brake mechanism 40 is operably coupled to one of the first or second idler plates 32 or 34. The rotation of the idler plates 32 or 34 is configured to actuate the brake mechanism 40 before either of the idler pulleys 36 or 38 are fully engaged with the flexible drive belt 47.

Figure 5:
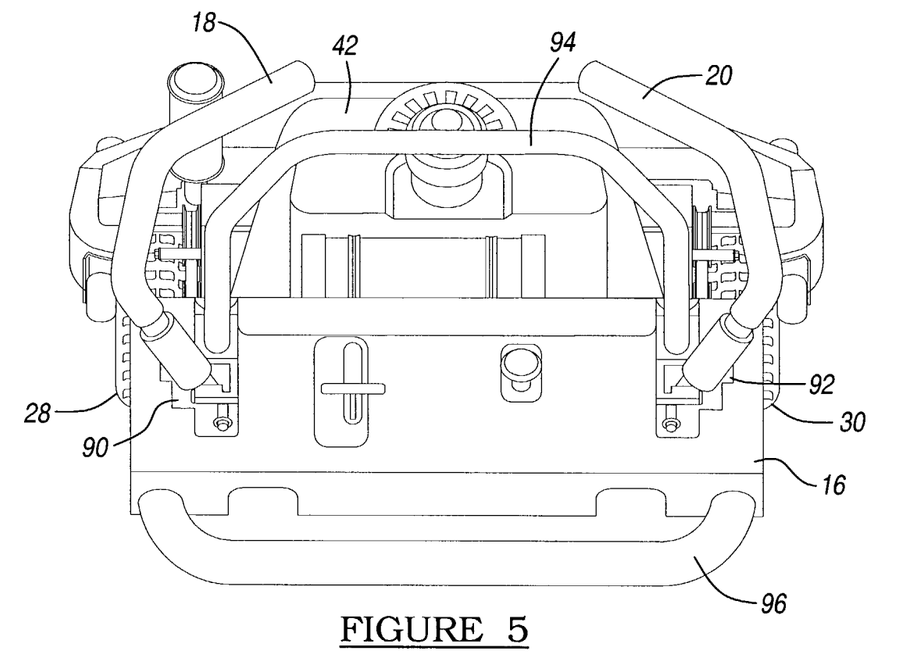
FIG. 5 represents a top view of a control panel of the mower of FIG. 1.

FIG. 5 represents a top view of the control panel 16. Shown are left and right control handles 18 and 20, which are moveable within left and right slots 90 and 92. Shown also are first and second fixed handles 94 and 96. Handle 94 is infinitely adjustable between a forward position and a rear position. In this regard, positioning the handle 94 in its full forward position allows for the handle 94 to be pushed further forward, thus increasing the amount of torque being applied. This is desirable during situations where, for example, the mower is being used on hilly terrain. To increase the sensitivity of the handles 18 and 20 while traveling over relatively flat terrain, the handle 94 can be affixed into a rear position.

Figure 6:
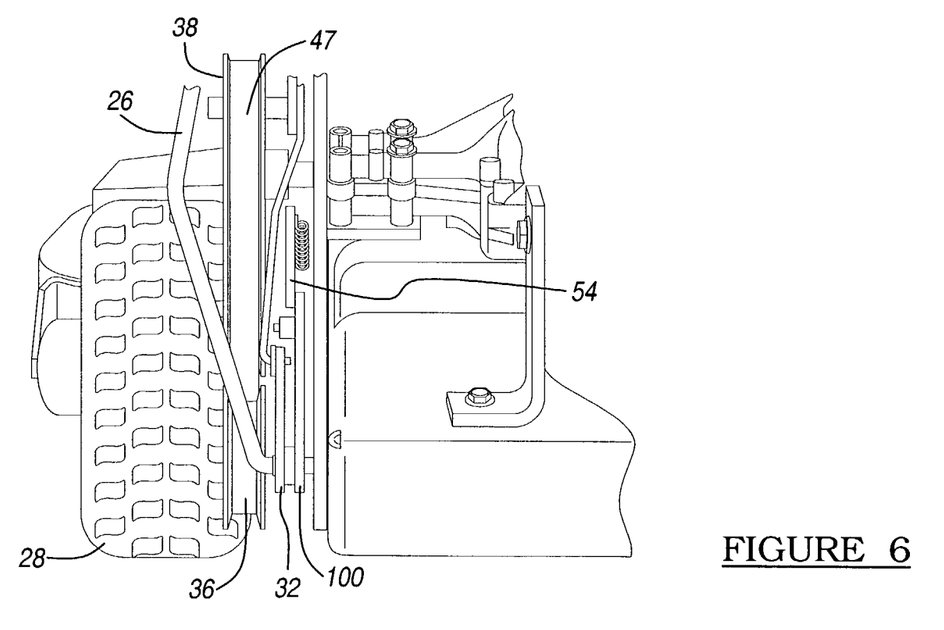
FIG. 6 represents a rear close-up view of the drive mechanism according to FIG. 4.
Figure 7:
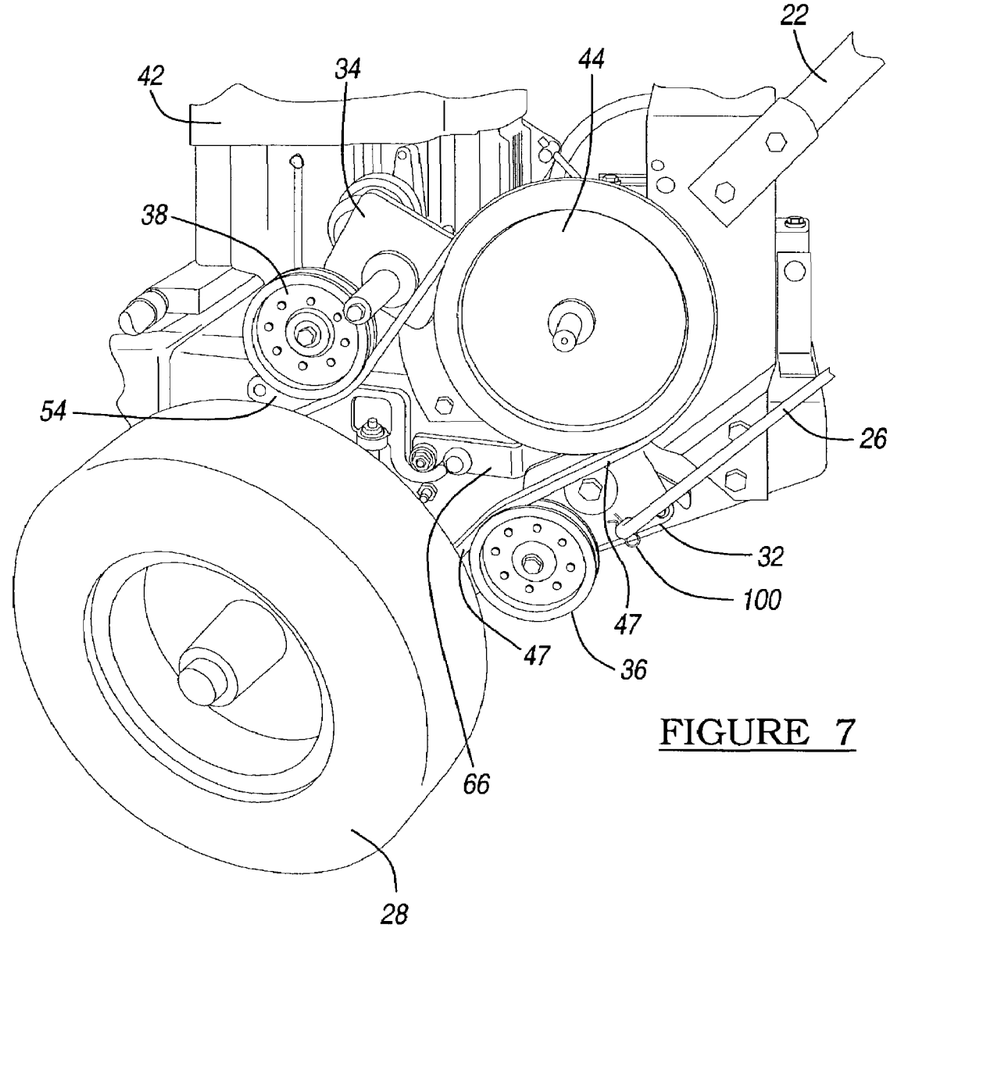
FIG. 7 represents a rear perspective view of the drive mechanism.

Each handle 18 and 20 function to control the rotation of independent left and right drive mechanisms 14 and 14'. Additionally, as described below, the left and right handles 18 and 20 engage a dead man feature and the brake mechanism 40. FIGS. 6 and 7 represent lower and rear perspective views of the linkages of the drive mechanism 14. As shown, the control linkage 26 is coupled to the first idler plate 32 by a cotter pin 100. As best seen in FIG. 7, the control arm is configured to transmit rotational forces to the first idler plate 32. As a result, the first idler plate 32 rotates the first idler pulley 36 as well as the linkage to the second idler pulley.

Figure 8:
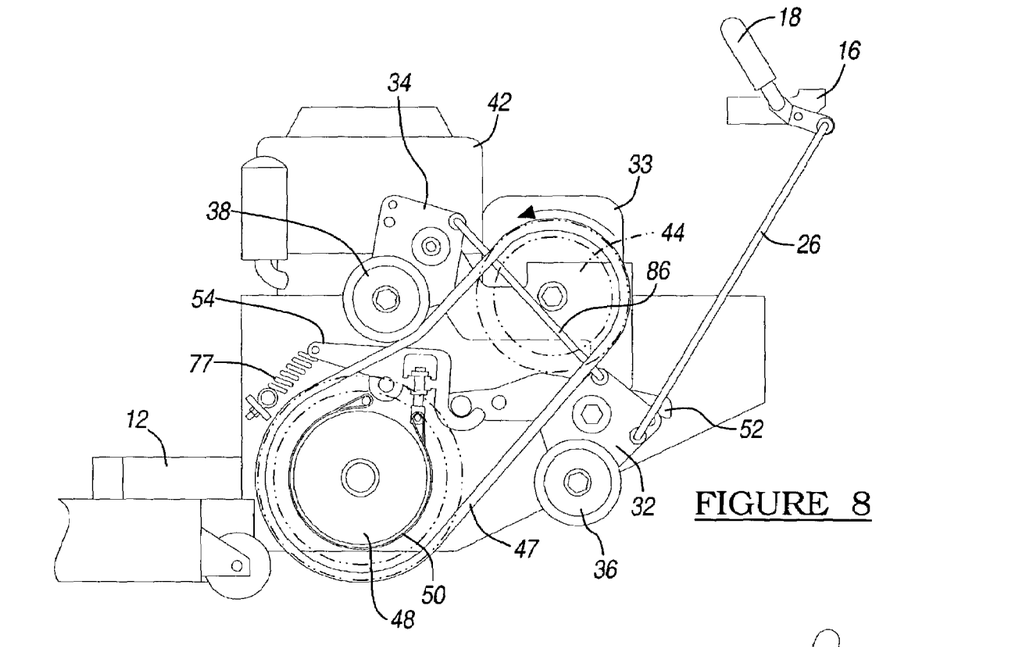
FIG. 8 represents the drive mechanism in a full forward condition.

FIGS. 8–11 describe the operation of the mower. As best seen in FIG. 8, when the handle 18 is pushed into its full forward position, the control arm 26 rotates the first idler plate 32 so as to pull the first idler pulley 36 away from the flexible drive belt 47. The connecting rod 86, which is disposed between the first and second idler plates 32 and 34, rotates the second idler pulley 38 and biases the second idler pulley 38 into the flexible drive belt 47. While the gear box 33 is driving the drive pulley 44 in a forward direction, the flexible drive belt 47 is driving the driven pulley 46 in a forward direction.

Figure 9:
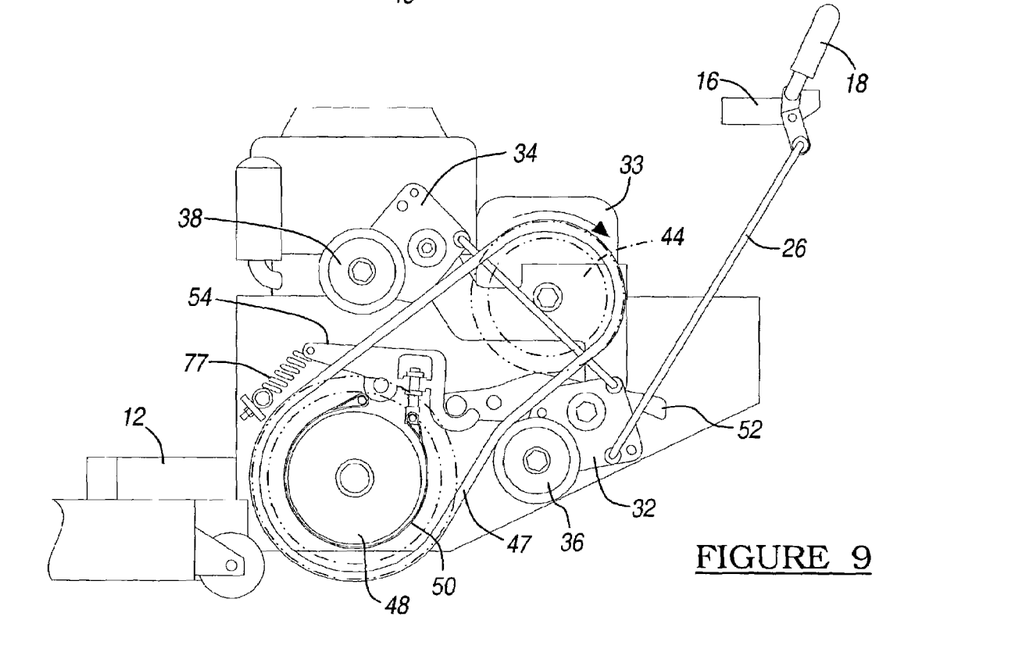
FIG. 9 represents the drive mechanism in a full reverse condition.

As best seen in FIG. 9, when the handle 18 is pulled to its full rear position, the control arm 26 rotates the first idler plate 32 so as to bias the first idler pulley 36 into the flexible drive belt 47. The connecting rod 86 rotates the second idler plate 34 so as to pull the second idler pulley 38 away from the flexible drive belt 47. As can be seen, the brake mechanism 40 has been disengaged in either of the forward or reverse positions.

Figure 10:
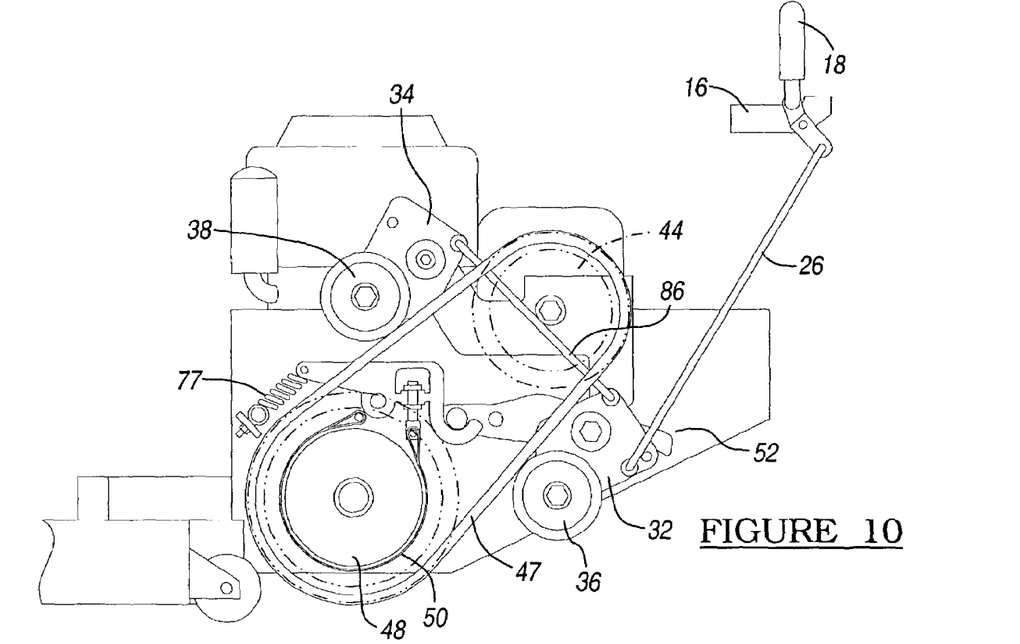
FIG. 10 represents the drive mechanism in an idle condition.
Figure 15:
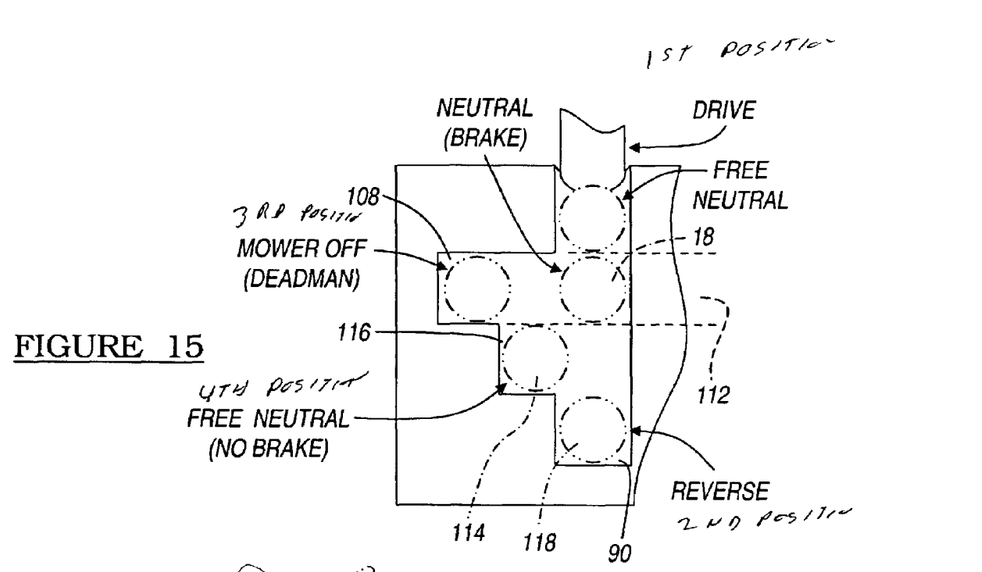
FIG. 15 represents the control regime of the present invention.

FIG. 10 depicts the drive mechanism in a neutral position. As can be seen, the handle 18 of the control panel 16 is in dead man position as shown in FIG. 15. This positions the control mechanism 26 such that the first and second idler plates 32 and 34 are positioned so the first and second idler pulleys 36 and 38 are in non-engaging positions with respect to the flexible drive belt 47. In this position, the flexible drive belt 47 is loose and no forces can be transmitted to the driven pulley 46. Further, as can be seen in the dead man position, the brake mechanism is not engaged. However, the fiction belt 50 is engaged by spring activation. The first end of the first member is not in a raised position which would release the brake mechanism 40.

Figure 11:
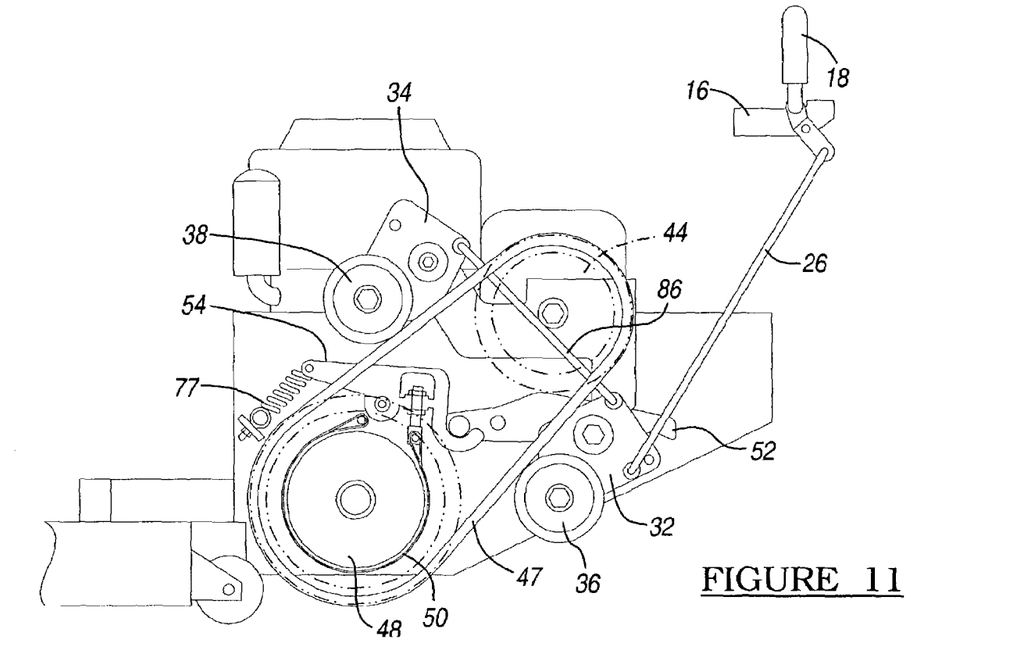
FIG. 11 represents the drive mechanism in a brake condition.

FIG. 11 represents a free neutral, no-brake condition which is found by slightly adjusting the position of the handle 18. In this regard, the handle 18 is moved with respect to the control panel 16 such that the first idler plate 32 is rotated slightly counterclockwise. The bearing 62 of the first idler plate 32 applies forces to the first member 52 which in turn applies forces to the second member 54, thus loosening the friction belt 50 about the brake drum 48. As can be seen, in this position the tensioning system 31 of the drive mechanism 14 does not engage either idler pulley 36 and 38 with the flexible drive belt 47.

Figure 12:
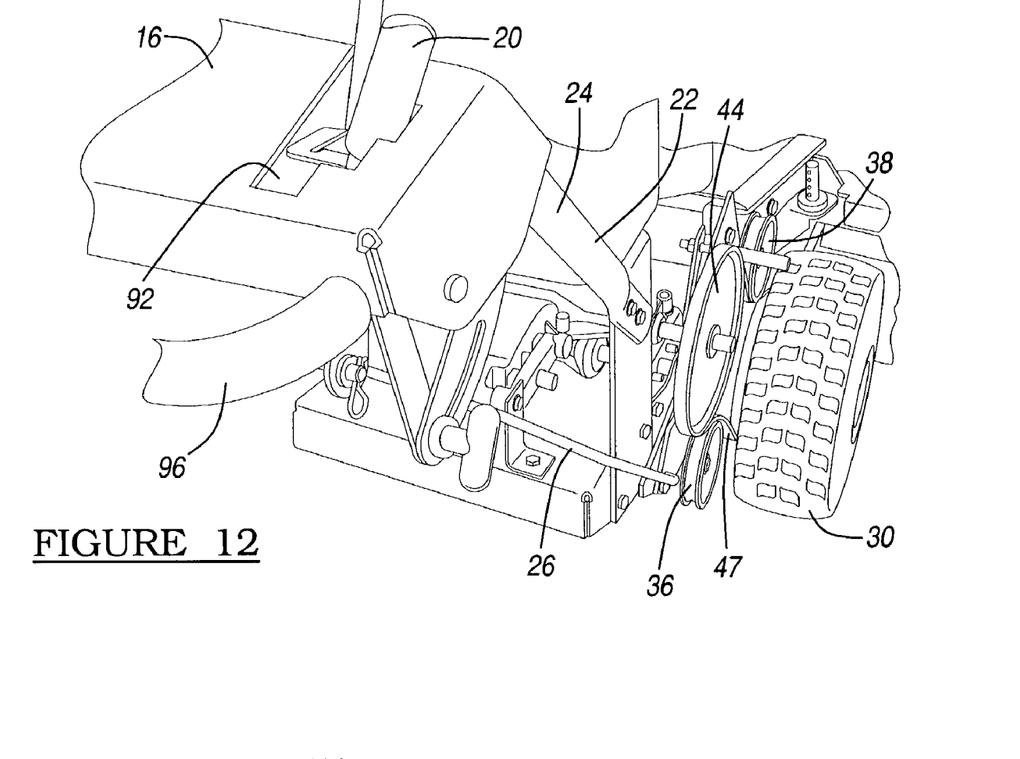
FIGS. 12–14 represent the control mechanism according to the teachings of the present invention.
Figure 13:
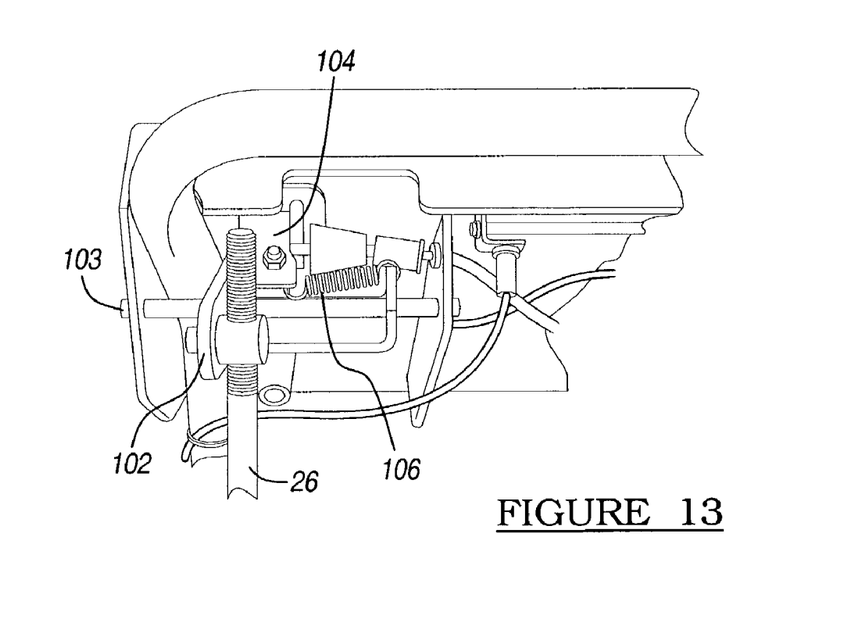
Figure 14:
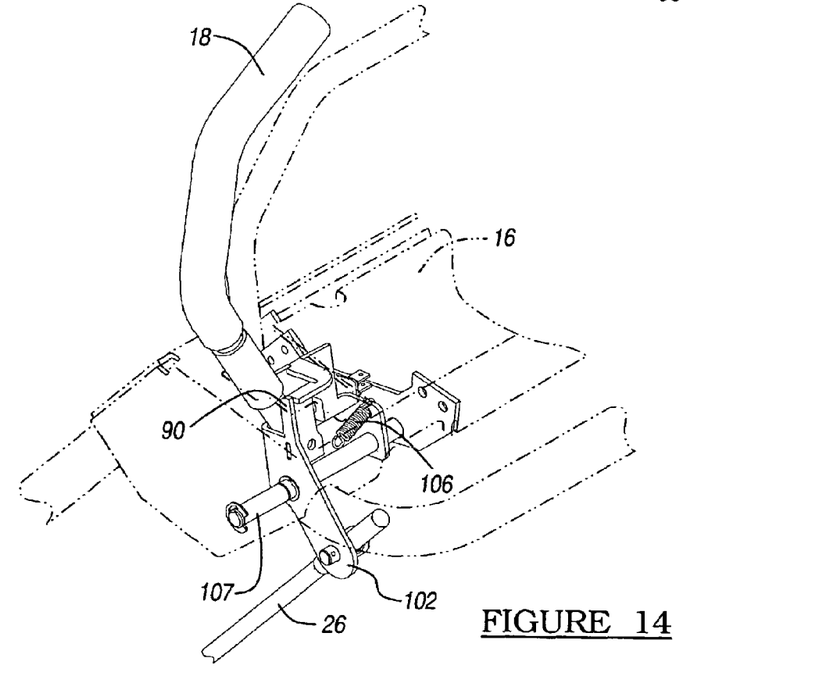

FIGS. 12–14 depict the coupling of the control mechanism to the drive mechanism. As best seen in FIG. 13, the control arm 26 is threadably coupled to a lever arm 102. The lever arm 102 is rotationally coupled to the support 22 by pivot rod 103. Coupled to the lever arm 102 is a bracket 104 which rotationally fits the control arm 18 to the support structure 22. Additionally fixed to the bracket 102 is a spring 106 which, in conjunction with spring 78, biases the control handle 18 into its dead man position 108. In this regard, an electrical switch 110 is provided under the control panel 16 which, when the handles 18 are released, prevent electrical current from flowing to the engine's ignition system, thereby stopping the mower's engine 42.

FIG. 15 shows a top view of the mower control panel 16. When the handle 18 is pushed forward into its full forward position, the lever arm 102 lifts the control arm 26 and rotates the idler plate 32 down and engages the second idler pulley 38.

When the handle 18 is pulled into the first neutral position 112, neither idler pulley 36 or 38 is biased into the flexible drive belt 47. Additionally, the brake mechanism 40 is engaged. Upon releasing the handle 18 in this position, the spring 106 snaps the handle 18 into the dead man position, thus killing the engine 42.

Should the handles 18 or 20 be pulled into the second neutral position 114, the spring 106 biases the handle 18 into a positive stop 116. This allows the mower 10 to be pulled around without engaging the brake mechanism 40 or disabling the engine 42. As described above, when the handles 18 and 20 are pulled into their full rear position 118, the first idler plate 32 is rotated, thus rotating the second idler plate 34.

Further represented in FIGS. 11 and 13 is the occupant presence system of the present invention. In operation, the occupant presence system retracts the tensioning system into the braking position of FIG. 11 and pulls the handle 18 into its dead man position 108. The occupant presence system is formed by the spring 77 of the tensioning system which brings the tensioning system into its braking position. This rotation of the first idler plate 32 lifts the control rod 26 so as to simultaneously rotate the handle 18 into the first neutral position. At this time, spring 106 rotates the handle 18 into the dead man position 108, thus cutting off electrical power to the mower's engine.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A lawn mower device comprising:
   a drive configured to rotate a shaft in a first and a second direction;
   a drive pulley coupled to the shaft;
   a driven wheel coupled to the drive pulley by a drive belt;
   a control arm;
   a tensioning system coupled to the drive belt, the tensioning system having a first idler plate configured to bias a first idler pulley against the drive belt when the drive is rotating the shaft in the first direction and a second idler plate configured to bias a second idler pulley against the drive belt when the drive is rotating the shaft in the second direction, the first and second idler plates are directly coupled together by a linkage such that rotation of the first idler plate causes direct rotation of the second idler plate by forces through the linkage;
   a brake mechanism coupled to the tensioning system, said brake mechanism configured to resist the rotation of the driven wheel; and
   wherein the control arm is configured to apply forces to the first idler plate to rotate the first idler plate and wherein the linkage applies forces from the first idler plate to the second idler plate.

2. The lawn mower device according to claim 1 wherein the first idler plate is coupled to a control handle by the control arm.

3. The lawn mower according to claim 1 wherein the first and second idler plates are rotatably coupled to a frame.

4. The lawn mower according to claim 3 wherein the rotation of the first idler plate to bias the first idler pulley into the drive belt rotates the second idler plate so as to pull the second idler pulley away from the belt.

5. The lawn mower according to claim 3 further comprising a spring coupled to one of the first or the second idler plates, said spring configured to position the tensioning system such that neither idler pulley is biased toward the tension belt.

6. The lawn mower according to claim 5 wherein said spring is configured to position the tensioning system to apply the brake mechanism.

7. The mower system according to claim 1 wherein said brake mechanism comprises a brake drum coupled to the drive wheel.

8. The mower system according to claim 7 wherein said brake mechanism further comprises a friction belt disposed about said brake drum and a first member being operably coupled to one of the first or second idler plate, wherein rotation of the first member actuates the brake.

9. The mower system according to claim 7 further comprising a second member, rotationally fixed to a frame, said second member being coupled to said friction belt.

10. A lawn mower comprising:
    a drive mechanism configured to drive a shaft in a first and second direction;

a pulley coupled to the shaft;
a drive wheel coupled to the pulley by a flexible driver member;
a control arm:
a tension system having a first tensioning means for applying tension to a first slack side of the flexible drive member when the drive shaft is driven in the first direction and a second tensioning means applying tension to the second slack side of the flexible drive member when the drive shaft is driven in a second direction, the first and second tensioning means are directly coupled by a linkage such that engagement of the first tensioning means causes disengagement of the second tensioning means;
a brake system operable to inhibit the rotation of the driven wheel, said brake system comprising a second member, rotatably fixed to a frame, said second member being pivotably coupled to said friction belt and the tension system, said brake system being actuated by said tension system; and
wherein the control arm is configured to apply forces to the first idler plate to rotate the first idler plate and wherein the linkage applies forces from the first idler plate to the second idler plate.

11. The mower according to claim 10 wherein said brake system comprises a friction member configured to engage a surface coupled to the driven wheel, and a first member coupled to the friction member, the first member being actuatable by the tension system to engage the surface.

12. The mower according to claim 11 wherein said first member is rotatably coupled to a frame.

13. The mower according to claim 12 wherein the brake system comprises a second member, said second member being coupled to the tension system and to the first member, said first member being configured to apply forces to the second member.

14. The mower according to claim 13 further comprising a spring coupled to the second member.

15. The mower according to claim 14 wherein said tension system comprises a first idler plate configured to bias a first idler pulley against the flexible drive member.

16. The mower according to claim 15 wherein said tensioning mechanism comprises a second idler plate configured to bias a second idler pulley against the flexible drive member.

17. The mower according to claim 16 further comprising a connection member disposed between first and second idler plate, wherein the rotation of the first idler plate rotates the second idler plate.

18. The mower according to claim 17 wherein the rotation of the first idler plate toward the flexible drive rotates the second idler plate away from the flexible drive.

19. The mower according to claim 17 wherein rotation of the second idler plate toward the flexible drive rotates the first idler plate away from the flexible drive.

20. The mower according to claim 10 further comprising a first moveable handle functionally coupled to the tensioning mechanism, and a second fixed handle configured to limit the travel of the first handle.

21. The mower according to claim 20 wherein the second fixed handle is adjustable from a first to a second position.

22. The mower according to claim 20 wherein the second handle is infinitely adjustable and fixable between a first and second position.

23. The mower according to claim 20 wherein said second handle is configured to be positioned in a first position when the mower is used on hilly terrain and a second position when the mower is used on flat terrain.

24. A lawn mower device comprising:
a drive configured to rotate a shaft in a first and a second direction;
a drive pulley coupled to the shaft;
a driven wheel coupled to the drive pulley by a drive belt;
a control arm;
a tensioning system coupled to the drive belt, the tensioning system having a first idler plate configured to bias a first idler pulley against the drive belt when the drive is rotating the shaft in the first direction and a second idler plate configured to bias a second idler pulley against the drive belt when the drive is rotating the shaft in the second direction, the first and second idler plates being coupled together by a linkage such that rotation of the first idler plate causes rotation of the second idler plate due to forces through the linkage;
a brake mechanism coupled to the tensioning system through a second member which is pivotally coupled to a frame at a single point, said brake mechanism configured to resist the rotation of the driven wheel;
a spring configured to bias the tensioning system into a first position, said brake mechanism configured to resist the rotation of the driven wheel when the tensioning system is in the first position wherein the first idler plate is coupled to a control handle by a first link and wherein rotation of the control handle rotates the first and second idler plates; and
wherein the control arm is configured to apply forces to the first idler plate to rotate the first idler plate and wherein the linkage applies forces from the first idler plate to the second idler plate.

25. The lawn mower according to claim 24 further comprising a second spring coupled to the control handle, said spring configured to bias the control handle into a dead man position.

26. The lawn mower according to claim 24 wherein the control handle is configured to move in a first and second direction, wherein movement of the handle in the first direction biases the first idler pulley toward and against the drive belt.

27. The lawn mower according to claim 26 wherein movement of the handle in the second direction biases the second idler pulley toward the drive belt.

28. The lawn mower according to claim 26 further comprising a spring attached to said handle, said spring configured to bias the handle into a third position, wherein the engines function is interrupted.

29. The lawn mower according to claim 28 wherein the spring is configured to bias the handle in a direction perpendicular to the first direction.

30. The lawn mower according to claim 26 wherein the control handle is configured be located in a first position, so as to disengage the brake mechanism and not interfere with the engine function and further not engage the drive mechanism.

31. The lawn mower according to claim 30 further including a spring configured to bias the handle into a positive stop.

* * * * *